April 26, 1938.   M. D. BELLINGER   2,115,247
VALVE
Filed July 22, 1936

Inventor
Marvin D. Bellinger
By
Attorney

Patented Apr. 26, 1938

2,115,247

UNITED STATES PATENT OFFICE 2,115,247

VALVE

Marvin D. Bellinger, Brownville, N. Y.

Application July 22, 1936, Serial No. 91,989

3 Claims. (Cl. 251—84)

This invention relates to an improved valve structure. It is concerned more particularly with a valve, of the so-called "rotary disc" type, particularly adapted for use in a system through which fluids containing suspended solids (e. g., relatively low-density pulp stocks) are forced under pressure, although the utility of the structure of the present invention is not restricted to such specific application.

In the transport of fluid pulps by pipe lines including valve units it heretofore has been a common difficulty to maintain the expected functioning of the valves, in such lines, due to lodging of solids in the valve structures.

It is an object of the present invention to provide an improved valve structure capable of functioning in proper manner in the transposition of fluids containing suspended solids, e. g., relatively coarse solids. Another object of the invention is the provision of a valve structure, operable in connection with low-density pulp, which is easy to assemble and to dismantle.

The above, and other, objects have been realized in the valve structure of the present invention. In the latter, the valve disc is functionally integral with a hollow valve stem, the valve disc and stem being capable of both rotary and, to a limited extent, reciprocatory movement about and along the longitudinal axis of a cylindrical stud fixedly mounted in the body of the structure, which stud serves to locate and hold in said body the disc-shaped valve seat. The valve stem, and hence the valve disc, is pressed toward the co-operating valve seat by means of a compression spring mounted on the stud, adjacent the outer end thereof, the degree of pressure of said spring against said stem being variable at will. In each of the valve discs and co-operating valve seats is an opening substantially semi-circular in form, the openings being registrable. The passageways of the valve structure, including saiu registrable openings, preferably are at least as large in cross-sectional area as is the pipe or conduit with which the valve structure is designed to co-operate, and they are so designed as not to provide any ledges or projections for lodgment of solids. There may be affixed to the valve stem a projection in the form of an indicator cooperating with stops on the exterior of the valve gland for limiting the extent of rotation of the stem and valve disc: in such case the exterior of the valve gland may, and preferably does, bear indicia significant of the relative position of the opening in the valve disc with respect to that of the opening in the valve seat, between the fully open and fully closed positions determined by said stops.

Figure 1:
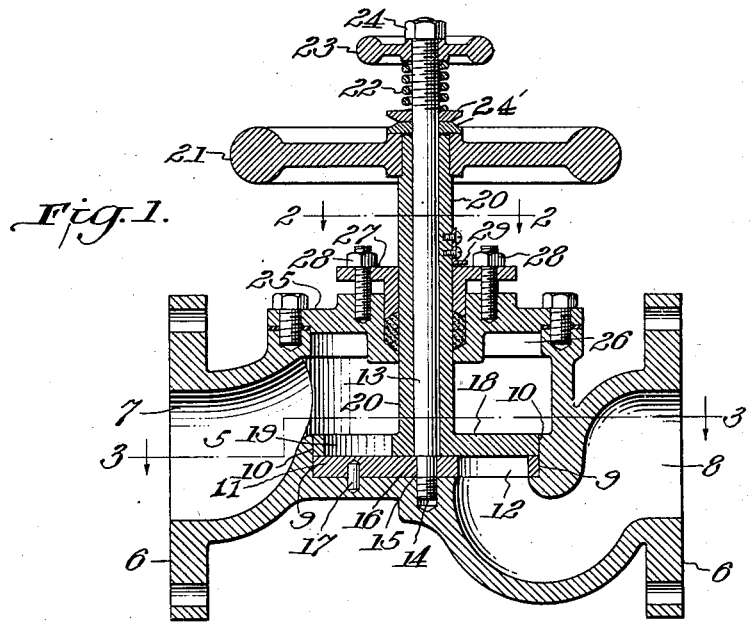
Figure 2:
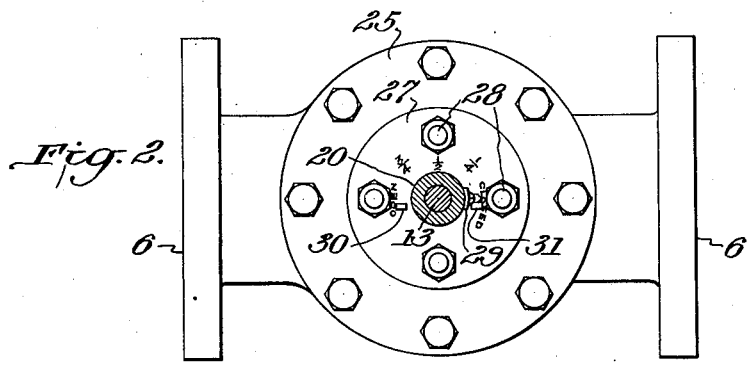
Figure 3:
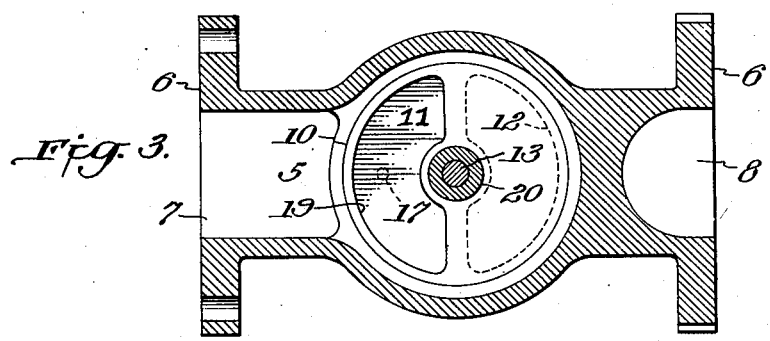

The invention will be more particularly described by reference to the accompanying drawing, wherein, Fig. 1 is a central vertical section through a valve embodying the invention, Fig. 2 is a sectional view taken on the line 2—2 of Fig. 1, and Fig. 3 is a horizontal sectional view taken on the line 3—3 of Fig. 1.

The valve embodying the invention comprises a body 5 provided with end flanges 6 by which it is secured to adjacent ends of pipes (not shown) in the pipe line in which it is to function and having an inlet passage 7 and an outlet passage 8. Between the passages 7 and 8 the body is formed with a circular recess 9 having an upstanding surrounding wall 10.

A valve seat in the form of a circular disc 11 seated in the recess 9 is provided with a substantially semi-circular opening 12 in register with the inlet passage 7. The valve seat is held in place in the recess 9 by a post or spindle 13 which has a reduced end portion 14 passing through a concentric opening 15 in the valve seat and threaded into the valve body. The reduced end portion 14 terminates in a shoulder 16 which engages the upper surface of the seat 11. A pin 17 or other suitable means may also be provided to positively lock the seat 11 against accidental turning movement.

A rotatable valve disc 18 having a substantially semi-circular opening 19 corresponding in size to the opening in the seat 11 and adapted to be brought into and out of registry therewith by turning of the disc 18 is disposed in the recess 9 and seated upon the valve seat 11. This valve disc 18 is formed with an integral axially disposed tubular stem 20 which is rotatable on the post 13 and which is provided at its upper end with a hand wheel 21 rigidly mounted thereon. The upper end of the post 13 extends beyond the upper end of the hollow stem 19 and a coiled spring 22 surrounding said post is confined between the upper end of said stem and an adjusting nut 23 which is threaded on the upper end of the post. A lock nut 24 is also provided for securing the adjusting nut 23 in place. The spring 22 serves to retain the valve disc on its seat and in order to facilitate turning of the valve stem, suitable bearing washers 24' are provided between the upper end of the stem and the springs.

A cap plate 25 having a central opening for the passage of the valve stem 19 and post or spindle 13 closes the opening 26 in the valve body and a packing gland 27 surrounding the valve stem is secured to said cap plate by bolts 28.

For the purpose of providing an indication as to the position of the opening in the valve disc relative to the opening in the seat, an index pointer 29 is mounted on the stem 20 and cooperating markings are provided on the upper flat surface of the gland 27. Suitable stops 30 and 31 are provided for engagement by said pointer at the fully open and closed position of the valve.

The cross sectional area of the passages 7 and 8 is equal from end to end thereof and that of the openings in the valve disc and seat is of a corresponding size so as not to retard the free flow of material through the valve. The passage through the valve is also preferably the same size as that of the pipe line in which it is connected. This is a very important feature of my valve as any restriction of the passage when handling suspended solids such as paper pulp often results in a stoppage of the passages and thus causes great inconvenience.

Another important feature of my valve, particularly when handling suspended solids, is that the valve disc is capable of axial as well as rotary movement with respect to its seat. In the event that solid particles work between the valve seat and disc so as to interfere with the closing of the valve, it is merely necessary for the operator to give an axial pull on the hand wheel 21, thus lifting the disc from its seat and flushing out the entrapped solids.

While a preferred embodiment of the invention has been shown for purposes of illustration, it will be understood that various changes in the details of construction may be resorted to without departing from the spirit of the invention within the scope of the appended claims.

I claim:

1. A valve comprising a body having a circular recess formed therein, a valve seat in the form of a removable apertured disc mounted in said recess, an upstanding spindle element having an end thereof extending through said seat and threaded into said body, said spindle having a shoulder engaging the surface of said valve seat to secure it in position in said recess, a rotatable valve disc disposed on said seat, said valve disc having an upstanding hollow stem journalled on said spindle, and a handle member on said stem for operating said valve.

2. A valve structure as defined in claim 1, in which the valve disc and hollow stem are mounted for both rotary and axial movement, and a compression spring mounted on said spindle adjacent the end thereof remote from the valve seat and held in compression between said hollow stem and an adjustable stop on said spindle, whereby said valve disc may be lifted off of its seat by exerting an axial pull on said handle in order to flush out solids entrapped between said valve and seat.

3. In a valve for handling fluids having solid matter suspended therein, a body having a passage extending therethrough of substantially equal cross sectional area from end to end thereof, said body having a circular recess formed therein, a valve seat in the form of a removable apertured disc mounted in said recess, an upstanding spindle element having an end thereof extending through said seat and threaded into said body, said spindle having a shoulder engaging the surface of said valve seat to secure it in position in said recess, a rotatable apertured valve disc disposed on said seat, said valve disc having an upstanding hollow stem journalled on said spindle, and a handle member on said stem for operating said valve, the apertures in said seat and valve disc having a cross sectional area as large as said passage through the valve body.

MARVIN D. BELLINGER.